Aug. 1, 1950　　　　W. M. WALLACE　　　　2,517,063
COMB TYPE COTTON HARVESTER
Filed Aug. 27, 1946　　　　　　　　　　4 Sheets-Sheet 3
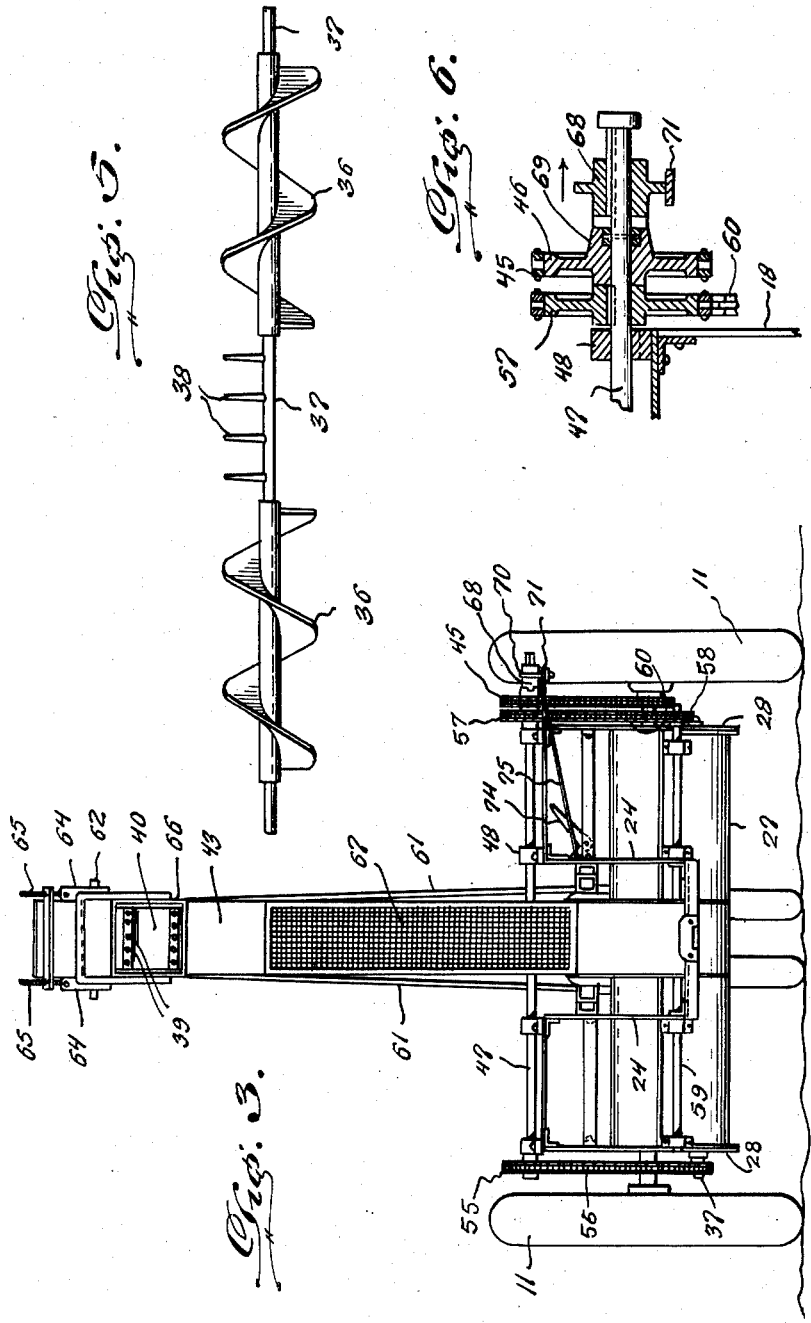
William M. Wallace,
INVENTOR.
BY Stanley Burch
Attorney Aug. 1, 1950   W. M. WALLACE   2,517,063
COMB TYPE COTTON HARVESTER
Filed Aug. 27, 1946   4 Sheets-Sheet 4
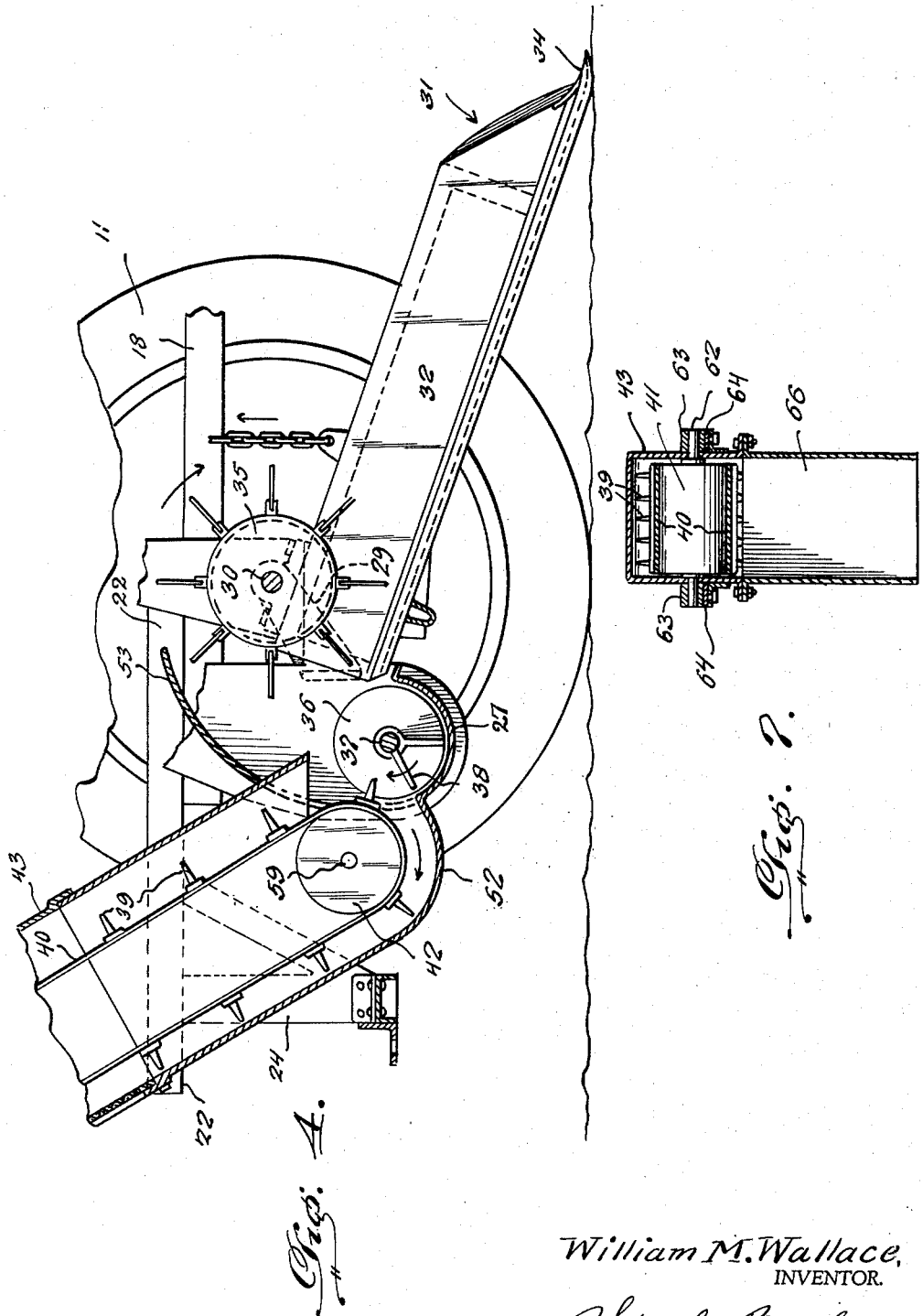
William M. Wallace,
INVENTOR.
BY J. Stanley Burch
Attorney Patented Aug. 1, 1950

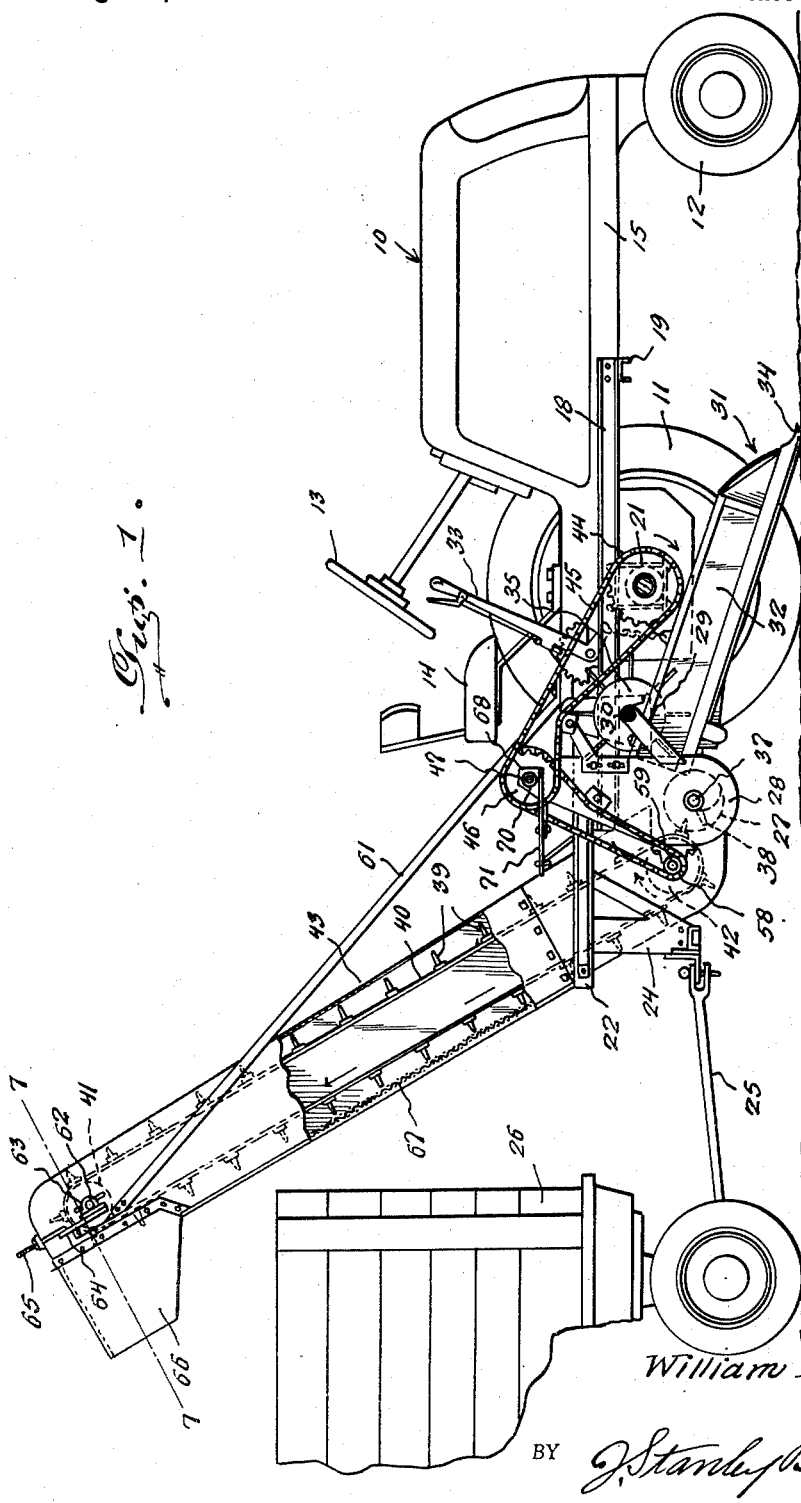

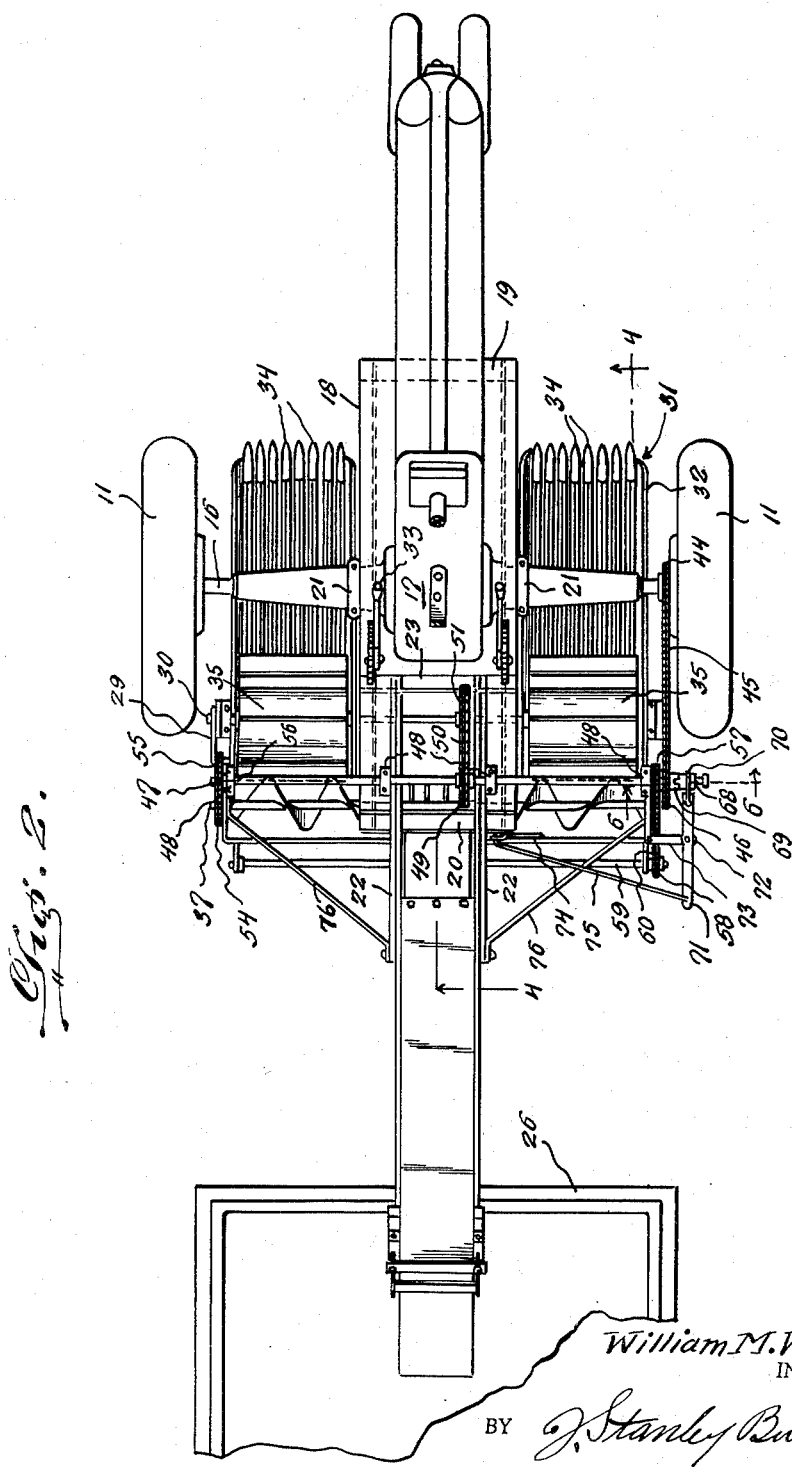

2,517,063

UNITED STATES PATENT OFFICE 2,517,063

COMB TYPE COTTON HARVESTER

William M. Wallace, Lubbock, Tex., assignor, by mesne assignments, to R. C. Johnson, Jr., Lubbock, Tex.

Application August 27, 1946, Serial No. 693,261

5 Claims. (Cl. 56—34)

This invention relates to cotton harvesters adapted as an attachment to a tractor and driven thereby, as from the rear drive wheels thereof, with means to strip the cotton bolls from the standing or growing plants in the field, with means to deliver the bolls to spiral conveyors which move the bolls to central rotating fingers from which the cotton bolls are picked up by fingers on an endless conveyor which elevates and discharges the cotton into a receiving vehicle trailing behind the tractor and harvester.

The primary object of the invention is to provide a cotton harvester which may be applied to a wheeled vehicle such as an ordinary farm tractor and mounted at the sides thereof in connection with the frame or chassis of the vehicle or tractor to operate over the rows of growing plants, preferably two rows at a time, and having novel stripping means to remove the cotton bolls from the plants and conveying means to receive the bolls from the stripping means as removed by bladed drums therefrom and delivered to a single central elevating conveyor which removes the bolls from the conveying means, separates the dirt and trash from the cotton and delivers the cleaned cotton into a receiving vehicle drawn along in rear of the vehicle or tractor.

A further object of the invention is to provide a cotton harvester with novel means to mount the same at the sides and rear of the tractor, including stripping scoops to remove the bolls from the plants as the machine is moved along the rows, with means to raise and lower the scoops from the driver's seat and means to remove and deliver the bolls from the scoops to conveyors which move the bolls to a central point in opposite directions inwardly to be intermittently picked up by central elevating conveyor and discharged at an elevated point into a receiving vehicle at the rear of the harvester.

The present invention consists in the novel form, combination and arrangement of parts hereinafter more fully described, shown in the accompanying drawings, and claimed.

In the drawings:

Figure 1 is a side elevation, partly in section, of a cotton harvester constructed in accordance with the invention, as applied to a tractor and towing a receiving vehicle.

Figure 2 is a top plan view thereof.

Figure 3 is a rear elevation.

Figure 4 is an enlarged fragmentary longitudinal section taken on the line 4—4 of Figure 2.

Figure 5 is an enlarged elevation of the spiral conveyor.

Figure 6 is an enlarged fragmentary sectional view taken on the line 6—6 of Figure 2.

Figure 7 is a sectional view of a detail of the elevator mechanism taken on the line 7—7 of Figure 1.

Referring to the drawings in detail, in which like reference characters refer to corresponding parts throughout the several views, 10 indicates an ordinary or conventional farm or agricultural tractor having rear drive wheels 11, front steering wheels 12 operated from wheel 13 adjacent driver's seat 14, and a chassis or frame 15 which extends rearwardly of the drive wheels 11 having the usual axle 16 and differential drive enclosing housing 17.

In accordance with the present invention, a supporting and mounting frame 18 is mounted rigidly on the rear of the tractor platform, chassis or frame 15 and includes a cross member or yoke 19 extending under the same at the front with rearwardly extending side bars bolted to the frame and connected at the back by a cross member or yoke 20 and bolted to the axle housings at each side as at 21. The frame 18 includes upper rear bars 22 connected at their forward ends by a cross member or yoke 23 and supporting a hitch including a depending hanger or yoke 24 to which a draw bar 25 of a trailer or receiving vehicle 26 for the cotton is coupled.

The frame 18 supports therebeneath, a transverse trough 27 with vertical end or side plates 28 having upwardly extending forward arms 29 in which with bearings on the side bars of the frame a transverse shaft 30 is journaled. Shaft 30 pivotally supports vertically swinging boll stripping scoops 31 at the upper rear portions of side plates 32 thereof at opposite sides of the tractor. Each scoop is tiltably adjusted vertically by means of a hand lever 33 pivoted on each side of the frame 18 and including the usual catches and notched segments cooperating therewith. The scoops include a plurality of spaced teeth or fingers 34 tipped by boll arresters to prevent the cotton from falling out of the scoop, such as disclosed in my co-pending U. S. application Ser. No. 565,475 filed November 28, 1944, now Patent 2,445,162 which fingers strip the bolls from the plants as the stalks pass between them during forward travel of the machine. The scoops are open at the back and discharge into the trough 27. A bladed drum 35 is fixed on the shaft 30 in rear of each scoop.

Trough 27 houses right and left hand spiral conveyors 36 which are spaced apart at the center on a shaft 37 journaled through plates 28 to conduct the cotton to the center of the trough 27. The shaft 37 extends throughout the length of the trough and at the center between the conveyors 36, is equipped with radial fingers 38 to turn therewith in a rearward and upward direction clockwise at the bottom and intermeshing, overlapping or intersecting spaced rows of fingers or prongs 39 on an endless elevating belt 40 operating around upper and lower pulleys 41 and 42 in an elevator housing 43 extending upwardly and rearwardly from the trough 27.

A sprocket wheel 44 is fixed to the tractor axle or wheel at one side for engagement by a chain 45 which also extends around a sprocket wheel 46 loose to a shaft 47 journaled in bearings 48 across the top of the frame. A sprocket wheel 49 is fixed to shaft 47 near the center and receives an endless chain 50 which is also engaged on a sprocket wheel 51 fixed to shaft 30 to drive bladed drums 35 clockwise at the rear ends of the stripper scoops 31 and move the cotton into the trough 27 which is arranged at the rear open discharge ends of the scoops and into which the lower receiving end of the elevator housing extends as a concaved bottom 52. An oval or curved plate 53 is placed over the top of the trough 27 and bolted thereto to extend partially over the drums 35 on either side to provide rear shields for cotton falling from the scoops delivered by the bladed drums.

Spiral conveyors 36 and fingers 38 are driven with the shaft 37 from the shaft 47 by sprocket wheels 54 and 55 and a chain 56, while the endless conveyor belt 40 is also driven through pulley 42 from the shaft 47 by sprocket wheels 57 and 58 on shaft 47 and a transverse shaft 59 to which pulley 42 is fixed and which is journaled in bearings at the rear of the frame 18 and trough 27, said sprocket wheels 57 and 58 having a chain 60 trained therearound. Conveyor housing 43 is mounted between bars 22 of frame 18 and supported by brace rods 61 between frame 18 and the sides of the upper portion of the conveyor housing 43. The shaft 62 of upper pulley 41 of the elevator belt 40 is journaled in bearings 63 mounted on slotted supports or plates 64 and adjustable by screws 65, to keep the elevator belt 40 taut. The elevator housing 43 has a rear discharge spout 66 at its upper end discharging into the receiving vehicle 26. The back or bottom of the elevator housing has an opening over which a heavy cleaner screen 67 is placed to allow the dirt and trash to fall through to the ground from the cotton carried up the elevator at the back by the fingers 39 as removed from the fingers 38.

If desired, the harvesting mechanism may be thrown into and out of operation through the shaft 47 by a throw-out clutch member or collar 68 splined to shaft 47 to engage a coacting clutch member 69 formed as the hub of sprocket wheel 46 loose on shaft 47, clutch collar 68 being grooved for engagement by a fork or yoke 70 on a clutch lever 71 pivoted at 72 on a support 73 and operated by a lever 74 connected to lever 71 by a connecting rod 75. Braces 76 may be provided between bars 22 and the plates 28. The frame construction, hook up and arrangement of the mechanism and drive means will vary slightly for different makes of conventional tractors related substantially as described and shown.

Thus, in the operation, in the forward motion of the tractor along a row or rows of growing plants, the cotton enters the stripper scoops properly adjusted vertically for different sized plants. The bolls are stripped from the plants and delivered by the rotatable bladed drums into the conveyor trough and moved to the center fingers thereof by the right and left hand conveyors in opposite directions, to be removed therefrom by the elevator fingers and discharged from the elevator into the vehicle 26 properly screened and cleaned in an effective manner without a power drive or extra prime mover or blowers and other complicated and expensive mechanism, thereby producing a machine of a simple, durable and economical construction to expeditiously and efficiently harvest crops or cotton.

I claim:

1. In a cotton harvester, an inclined stripping scoop, a conveyor trough arranged transversely at the rear end of said scoop, a sole rotatable drum having blades thereon for delivering bolls stripped by the scoop into said trough, means for moving the bolls lengthwise in said trough, spaced rotatable fingers engaging the bolls in said trough, an elevator including a belt extending upwardly from said trough, and prongs carried by said belt intermeshing with said fingers.

2. In a cotton harvester, a trough, means for stripping cotton bolls from plants, a sole rotatable drum having blades thereon delivering the bolls into said trough, a conveyor housing extending upwardly from said trough, rotatable means in said trough, spaced fingers carried by said rotatable means adjacent said housing, means for moving the bolls along the trough into the presence of said fingers, an endless belt movable in said conveyor housing, and prongs carried by said belt spaced to pass between said fingers and move the cotton bolls from the trough upwardly in said conveyor housing.

3. In a cotton harvester, a trough, means for stripping cotton bolls from plants, a sole rotatable drum having blades thereon delivering the bolls into said trough, a conveyor housing extending upwardly from said trough, rotatable means in said trough, spaced fingers carried by said rotatable mens adjacent said housing, means for moving the bolls along the trough into the presence of said fingers, an endless belt movable in said housing, prongs carried by the belt spaced to pass between said fingers and move the cotton bolls from said trough upwardly along a bottom wall of the housing, said housing having an opening in the bottom wall, and a screen extending over said opening.

4. In a cotton harvester, a trough, means for stripping cotton bolls from plants, a sole rotatable drum having blades thereon delivering the bolls into said trough, a conveyor housing extending upwardly from said trough, rotatable means in said trough, spaced fingers carried by said rotatable means adjacent said housing, means for moving the bolls along the trough into the presence of said fingers, an endless belt movable in said conveyor housing, prongs carried by said belt spaced to pass between said fingers and move the cotton bolls from the trough upwardly in said conveyor housing, and a concave wall section connecting the conveyor housing with said trough.

5. In a cotton harvester, an inclined stripping scoop, a conveyor trough arranged transversely at the rear end of said scoop, a single rotatable drum having blades thereon for delivering bolls stripped by the scoop into said trough, means for moving the bolls lengthwise in said trough, spaced rotatable fingers engaging the bolls in said trough, an elevator including a belt extending upwardly from said trough, prongs carried by said belt intermeshing with said fingers, and a curved plate extending over said trough laterally of said elevator.

WILLIAM M. WALLACE.

REFERENCES CITED

The following references are of record in the file of this patent:

UNITED STATES PATENTS

| Number | Name | Date |
| --- | --- | --- |
| 383,556 | Brainard | May 29, 1888 |
| 1,638,867 | Melton | Aug. 16, 1927 |
| 1,842,737 | Tharp | Jan. 26, 1932 |
| 1,926,338 | Johnston | Sept. 12, 1933 |
| 1,990,816 | Conrad | Feb. 12, 1935 |
| 2,013,582 | Preisser | Sept. 3, 1935 |
| 2,079,547 | Court | May 4, 1937 |
| 2,138,576 | Gebert | Nov. 29, 1938 |
| 2,355,880 | Macha | Aug. 15, 1944 |